United States Patent
Oz et al.

(10) Patent No.: US 7,877,505 B1
(45) Date of Patent: Jan. 25, 2011

(54) CONFIGURABLE RESOLUTION POLICY FOR DATA SWITCH FEATURE FAILURES

(75) Inventors: Doron Oz, Yehuda (IL); Sarel Altshuler, Haifa (IL); Simon Chatterjee, London (GB)

(73) Assignee: Cisco Technology, Inc., San Jose, CA (US)

( * ) Notice: Subject to any disclaimer, the term of this patent is extended or adjusted under 35 U.S.C. 154(b) by 1073 days.

(21) Appl. No.: 11/409,475

(22) Filed: Apr. 21, 2006

(51) Int. Cl.
*G06F 15/173* (2006.01)

(52) U.S. Cl. .................. 709/238; 709/200; 709/223; 709/224; 709/239; 709/240; 709/241; 709/242; 713/153; 370/229; 370/412; 370/422

(58) Field of Classification Search ......... 709/238–242, 709/200, 223, 224; 370/229, 412, 422; 713/153
See application file for complete search history.

(56) References Cited

U.S. PATENT DOCUMENTS

| | | | |
|---|---|---|---|
| 5,260,945 A | | 11/1993 | Rodeheffer |
| 6,078,953 A | * | 6/2000 | Vaid et al. .................. 709/223 |
| 6,151,322 A | | 11/2000 | Viswanath et al. |
| 7,222,147 B1 | * | 5/2007 | Black et al. .................. 709/200 |
| 7,349,960 B1 | * | 3/2008 | Pothier et al. ............... 709/224 |
| 2002/0145981 A1 | | 10/2002 | Klinker et al. |
| 2002/0174207 A1 | * | 11/2002 | Battou ........................ 709/223 |
| 2002/0184487 A1 | * | 12/2002 | Badamo et al. ............. 713/153 |
| 2003/0037136 A1 | | 2/2003 | Labovitz et al. |
| 2004/0146062 A1 | | 7/2004 | Parikh et al. |
| 2005/0180429 A1 | | 8/2005 | Ghahremani et al. |
| 2006/0233100 A1 | * | 10/2006 | Luft et al. ................... 370/229 |
| 2007/0150614 A1 | * | 6/2007 | Ramachandran et al. .... 709/238 |
| 2010/0061391 A1 | * | 3/2010 | Sindhu et al. ............... 370/412 |
| 2010/0061394 A1 | * | 3/2010 | Sindhu et al. ............... 370/422 |

OTHER PUBLICATIONS http://www.cisco.com/en/US/products/hw/routers/ps167/products_white_paper09186a.., Feb. 15, 2006.
http://www.cisco.com/en/US/products/hw/modules/ps2706/prod_brochure0900aecd80.., Feb. 15, 2006.
http://www.cisco.com/en/US/products/hw/routers/products_category_technologies_ove.., Feb. 15, 2006.
Security Services Integration with Cisco Catalyst 6500 and 7600 Series Services Modules. (2005).
A Supplementary European Search Report dated May 4, 2010, which issued during the prosecution of Applicant's European Patent Application No. EP 06832231.

* cited by examiner

*Primary Examiner*—Thu Ha T Nguyen
(74) *Attorney, Agent, or Firm*—Abelman, Frayne & Schwab

(57) ABSTRACT

A method for communication includes associating respective feature chains with a plurality of interfaces of a data switch. The feature chains include service features. A respective failure policy is defined for each of one or more of the service features in each of the feature chains. Upon detecting a failure in a service feature in a feature chain associated with one of the interfaces, data packets are routed through the data switch while applying, responsively to the failure, the respective failure policy to the one of the interfaces.

23 Claims, 2 Drawing Sheets

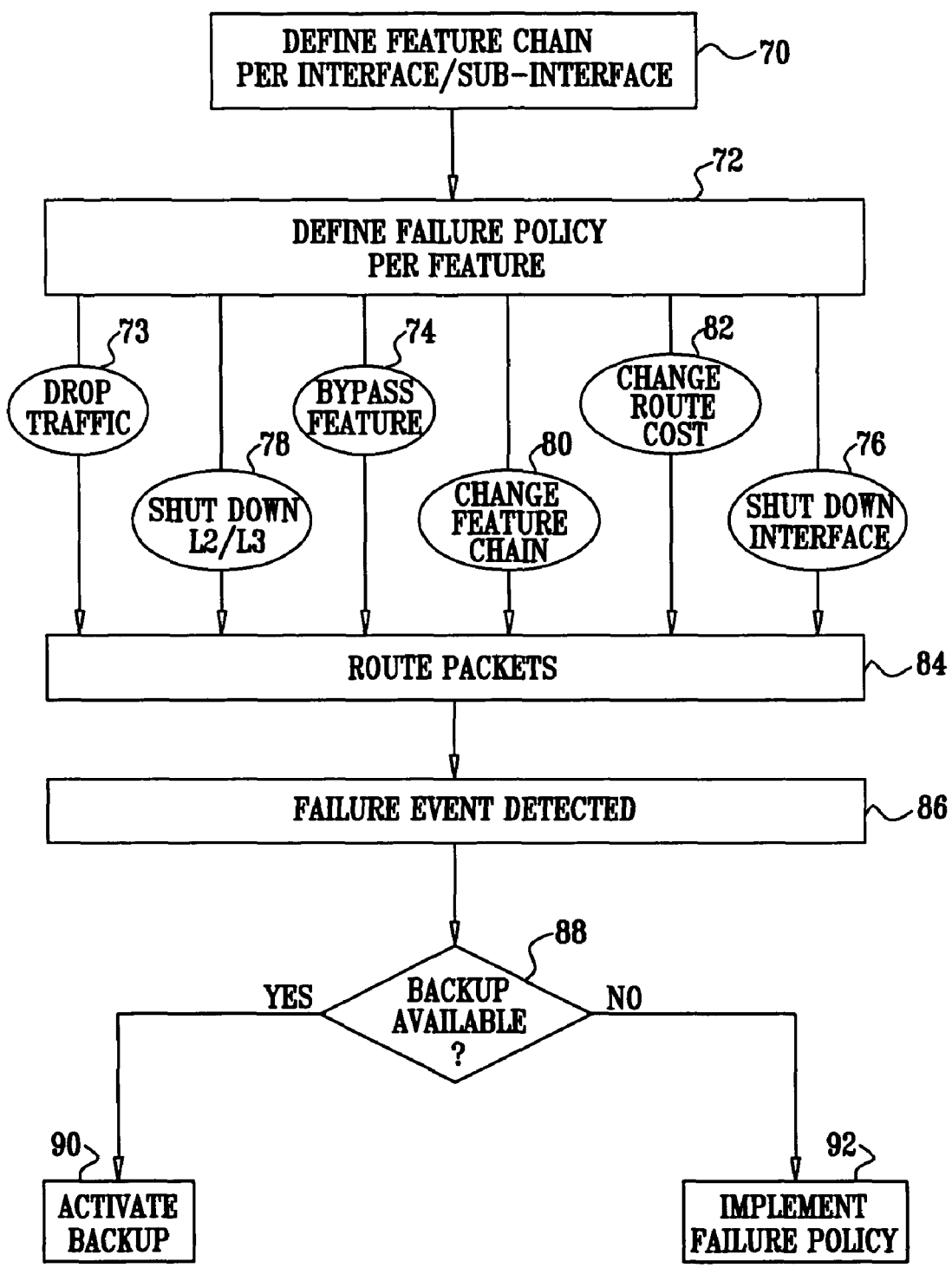

CONFIGURABLE RESOLUTION POLICY FOR DATA SWITCH FEATURE FAILURES

FIELD OF THE INVENTION

The present invention relates generally to communication systems, and specifically to configuration of service features provided on data switch platforms.

BACKGROUND OF THE INVENTION

Routers are data switches that handle connections between different networks. A router identifies the addresses on data packets passing through the switch, determines which route the transmission should take, and then forwards the packets to their destinations. Routers typically operate at the network layer (Layer 3 in the well-known Open Systems Interconnect [OSI] model), using Internet Protocol (IP) addressing and routing conventions.

Advanced routers currently on the market not only route packets, but also offer a variety of additional service features. For example, Cisco Systems® Inc. (San Jose, Calif.) offers the following features in its 12000 Series Routers and Catalyst 6500 Series Switches:

Quality of Service (QoS) control, with tiered levels of service (including committed access rates, congestion avoidance, prioritization and low-latency queuing, rate-limiting and traffic shaping).

Virtual private network (VPN) and tunneling services.

Security services (such as access control lists [ACLs]/packet filtering, unicast reverse path forwarding [uRPF], firewalls, intrusion and traffic anomaly detection, protection against denial of service [DoS] attacks, IPSec encryption and decryption).

Accounting, statistics and billing services.

The present invention will be more fully understood from the following detailed description of the embodiments thereof, taken together with the drawings in which:

BRIEF DESCRIPTION OF THE DRAWINGS

FIG. 3 is a flow chart that schematically illustrates a method for defining and implementing feature failure policies, in accordance with an embodiment of the present invention.

DETAILED DESCRIPTION OF EMBODIMENTS

Figure 1:
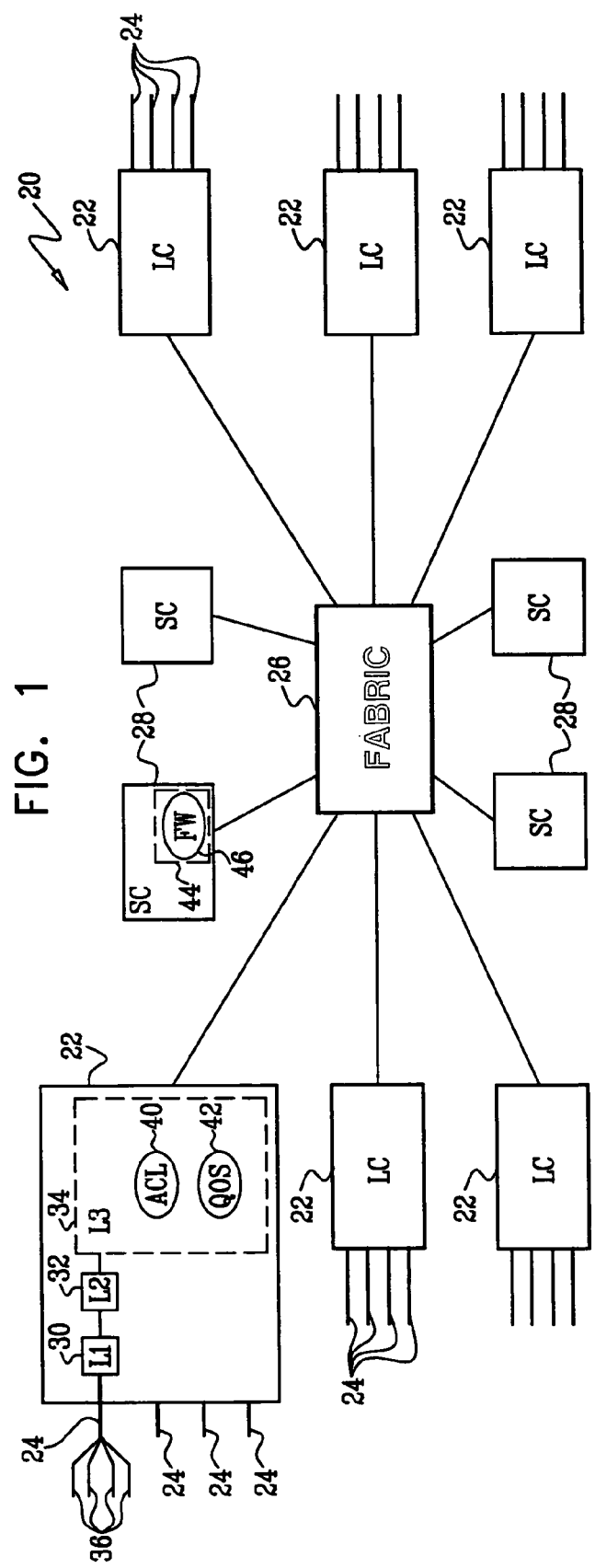
FIG. 1 is a block diagram that schematically illustrates a service-enabled router, in accordance with an embodiment of the present invention.

FIG. 1 is a block diagram that schematically illustrates a service-enabled router 20, in accordance with an embodiment of the present invention. The router comprises multiple line cards 22, each having one or more interfaces 24 for connecting to communication lines. The line cards are interconnected via a switching core, which typically has the form of a switch fabric 26. The router may also comprises one or more service cards 28, also connected to fabric 26, for applying certain services to data packets processed by the router, as described hereinbelow.

Typically, packets are received in line cards 22 by a Layer 1 (physical layer) processor 30 and are then processed by a Layer 2 (medium access control [MAC]) processor 32 and a Layer 3 (network layer) processor 34, as are known in the art. Optionally, a given interface 24 may serve multiple virtual sub-interfaces 36, such as Virtual Local Area Networks (VLANs). As another option, the interface may be a virtual interface, such as a tunnel interface, which is not related to a particular physical interface. Layer 3 processor 34 may serve as a service processor, to apply additional service features to each packet. (Alternatively, line card 22 may comprise a separate service processor, not shown in the figure, for this purpose.) Exemplary features shown in FIG. 1 include an ACL filter 40 and a QoS controller 42. After applying the appropriate services to the packet, the ingress line card passes the packet to fabric 26.

In some cases, packets may be subject to additional processing features that are performed on service cards 28, rather than line cards 22. For example, in the configuration shown in FIG. 1, some (or all) packets are passed by fabric 26 to a firewall 46 on service card 28. This firewall is implemented by a service processor 44 on the service card.

Fabric 26 then passes the packets to the appropriate egress line card, which may apply additional processing features to the packets before transmitting them onward via one of interfaces 24.

The structure of router 20 in FIG. 1 and the order of processing operations in the figure are shown here solely by way of example, to illustrate one possible implementation of the principles of the present invention. Alternative router and service feature configurations will be apparent to those skilled in the art and are considered to be within the scope of the present invention. The functional blocks identified within the router are presented for the sake of conceptual clarity and do not necessarily reflect the actual hardware or software structure of the router. Rather, the functions of an individual block that is shown in the figure may be divided among multiple physical blocks in an actual implementation of the router or, conversely, a number of different blocks may be combined into the functions of a single processor. The elements of router 20 may be implemented using dedicated or programmable hardware elements or, alternatively, in software running on an embedded microprocessor or computing platform. This software may be downloaded to the router in electronic form, over a network, for example, or it may alternatively be provided on tangible media, such as optical, magnetic, or electronic memory media.

Figure 2:
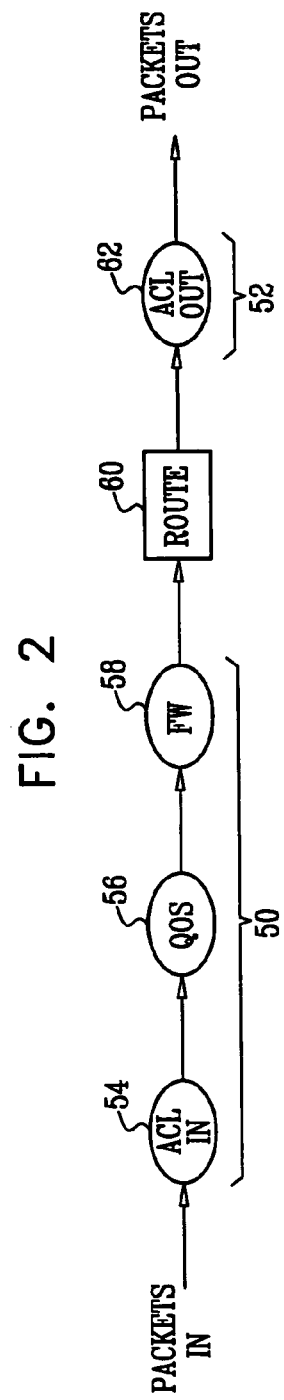
FIG. 2 is a flow chart that schematically illustrates feature chains applied to packets processed by a router, in accordance with an embodiment of the present invention.

FIG. 2 is a flow chart that schematically illustrates processing features applied to packets transferred through router 20, in accordance with an embodiment of the present invention. The features are arranged in an ingress feature chain 50 and an egress feature chain 52. Both the ingress and egress feature chains may be defined individually for each ingress interface (or sub-interface) and egress interface (or sub-interface) in the router. Thus, the operator of router 20 may provide different sets of features to different users, who are connected to different, respective interfaces of the router. The order of features may also be varied from one interface to another. Furthermore, for a given interface, different feature chains may be defined for different traffic directions (ingress or egress).

In the example shown in FIG. 2, ingress feature chain 50 comprises an ingress ACL filter 54, a QoS controller 56, and a firewall 58. (The ACL filter is a collection of permit and deny conditions that apply to IP addresses of incoming packets.) Packets that successfully pass through the ingress feature chain are forwarded by a routing process 60 to the egress path. In this case, egress chain 52 comprises only a single feature: an egress ACL filter 62. The features in the ingress and egress feature chains may be implemented either in line cards 22 or in service cards 28, depending on the configuration and capabilities of the router.

Alternatively, different features and larger or smaller numbers of features may be defined in each of the ingress and egress feature chains. Representative features include those listed in the Background of the Invention above, as well as the following:

Aggregated or sampled netflow accounting
Policy-based routing (PBR)
BGP Policy Accounting (BGP-PA)
QoS Policy Propagation via BGP (QPPB)
Traffic redirection, such as Web cache redirect (WCCP)
Lawful Interceptioh (LI)
Network address translation (NAT/PAT)
Network-based application recognition (NBAR)
Voice Session Border Control (S/BC)
Server load balancing.

Other applicable features will be apparent to those skilled in the art and are considered to be within the scope of the present invention.

In many cases, router 20 is configured with redundant components, so that service features can be maintained even if the component running a particular feature fails. In some cases, however, there may be no backup available. For example, multiple failures may occur concurrently, or the service provider operating the router may have chosen to reduce cost by reducing (or eliminating) redundancy. In such events, router 20 applies a predetermined failure policy in deciding how to respond to the failure. Embodiments of the present invention permit the failure policy to be configured and applied individually for each interface 24 or sub-interface 36 of the router and each feature on this interface, as described hereinbelow.

FIG. 3 is a flow chart that schematically illustrates a method for defining and implementing failure policies in router 20, in accordance with an embodiment of the present invention. Feature chains are initially defined for each interface 24 (and possibly for some or all sub-interfaces 36) in the router, at a feature definition step 70. Additionally or alternatively, feature chains may be defined for certain traffic classes and/or specific protocols. These class- or protocol-specific feature chains may extend across multiple interfaces 24 or across all the interfaces.

A failure policy is then defined for each feature (or feature type) in each feature chain, at a failure definition step 72. In other words, the same feature appearing in feature chains of different interfaces or sub-interfaces may have a different associated failure policy in each chain. The failure policy may act on the whole feature chain, for example, by changing the interface state, altering the behavior of other service features in the chain, or adding and/or removing service features.

Exemplary failure policies include the following:

A traffic dropping policy 73—Traffic received on or destined for the interface in question is simply discarded in the event that the feature in question fails. This policy is equivalent to routing the traffic to a non-existent egress interface (which, for example, can lead to loss of unicast IPv4 traffic, without necessarily affecting IPv6, multicast, and other traffic types).

A service bypass policy 74—The failed feature is temporarily eliminated from the feature chain, so that packets are passed to the next feature along the chain.

An interface shutdown policy 76—Typically, Layer 1 processor 30 is shut down when the feature in question fails. In this case (in contrast to drop traffic policy 72), the router upstream of the interface in question will detect that the interface is down and will attempt to reroute packets through other interfaces or routers. This policy may not be desirable, for example, when different feature chains are assigned to different sub-interfaces of the same interface, since it will force all of the sub-interfaces to shut down.

A protocol shutdown policy 78—Either Layer 2 processor 32 or Layer 3 processor 34 is shut down. This policy can be applied per sub-interface. It can also be applied per protocol, so that a given Layer 3 protocol, such as IPv4, is blocked, while other Layer 3 protocols are permitted to pass, for example.

A feature chain change policy 80—Typically, another feature is substituted for the failed feature. For example, upon failure of a firewall or other security measure implemented by one of service cards 28, a stringent ACL may be applied on the line card 22 serving the interface in question. As another example, a failure of a voice-related service could cause activation of an ACL that blocks voice traffic.

A route cost change policy 82—Layer 3 processor 34 may advertise a different (typically higher) cost for routing of packets through the interface in question, using routing protocols known in the art. As a result, other routers will seek to route traffic away from this interface.

The above policies are listed solely by way of example, and other policies may similarly be used.

Once the feature chains and failure policies have been defined, router 20 is operational and proceeds to route packets through interfaces 24, subject to the applicable services specified by the feature chains, at a routing step 84. Normal routing continues in this manner unless and until a failure event is detected in one of the service features, at a failure detection step 86. The appropriate processor in the router then determines whether there is a redundant backup component available to take the place of the failed feature, at a backup availability checking step 88. If so, the backup component is activated, at a backup activation step 90. The interface (or interfaces) affected by the failure may then continue operation without change to the feature chain.

Alternatively, when it is determined at step 88 that there is no available backup, the router implements the predefined failure policy, at a policy invocation step 92. As a result, the failed service may be bypassed, the affected interface may be shut down, packets on the interface may be dropped, or other actions may be taken, such as those listed above. Upon recovery of the failed feature, operation of the affected interface typically returns to normal.

Although the embodiments above are described with reference to a router, i.e., a Layer 3 data switch, the principles of the present invention may similarly be applied in providing service features in data switches of other types, such as Layer 2 data switches. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for handling a failure in a data switch, the method comprising:

selecting a service feature provided on the data switch, which is applied to data packets transferred through the data switch by:

an ingress line card of the data switch having at least one ingress interface;

a service card of the data switch; and an egress line card of the data switch having at least one egress interface;

defining a first feature chain as a sequentially-traversed list containing at least one feature handled by the ingress line card, followed by at least one feature handled by a routing process applied by the service card, followed by at least one feature handled by the egress line card, and comprising a service feature;

associating the first feature chain with a first interface of the data switch;

defining a first failure policy for the service feature in the first feature chain, wherein the first failure policy includes a change in the first feature chain;

detecting a failure in the service feature in the first feature chain associated with the first interface;

routing data packets through the data switch while applying, responsively to the failure, the first failure policy to the first interface; and invoking a redundant component as a backup for the service failure when the redundant component is available, and applying the first failure policy when there is no redundant component available.

2. The method according to claim 1, further comprising defining a second feature chain, different from the first feature chain, associated with a second interface of the data switch.

3. The method according to claim 1, further comprising defining a second failure policy, different from the first failure policy, in a second feature chain.

4. The method according to claim 3, wherein defining the first and second failure policies comprises assigning the first failure policy to the service feature in the first feature chain and assigning the second failure policy to the service feature in the second feature chain.

5. The method according to claim 1, wherein the service feature is selected from a group consisting of: Quality of Service (QoS) features, virtual private network (VPN) features, security features, accounting features, statistics and billing features, netflow features, routing features, traffic redirection features, interception features, network address translation (NAT) features, application recognition features and load balancing features.

6. The method according to claim 1, wherein defining the first failure policy comprises defining a traffic dropping policy.

7. The method according to claim 1, wherein defining the first failure policy comprises defining a service bypass policy.

8. The method according to claim 1, wherein defining the first failure policy comprises defining an interface shutdown policy.

9. The method according to claim 1, wherein defining the first failure policy comprises defining a protocol shutdown policy.

10. The method according to claim 1, wherein defining the first failure policy comprises defining a feature chain change policy.

11. The method according to claim 10, wherein the first feature chain includes a firewall, the method further comprising defining a feature chain change policy which includes activating access control list (ACL) filtering responsively when the firewall fails.

12. The method according to claim 1, wherein defining the first failure policy comprises defining a route cost change policy.

13. A communication data switch, comprising:
a plurality of line cards;
a plurality of interfaces in the line cards, for coupling to communication lines;
a service processor which is arranged:
  to define a service feature provided on the data switch, which is applied to data packets transferred through the communication data switch by:
    an ingress line card of the communication data switch having at least one ingress interface;
    a service card of the data switch; and
    an egress line card of the communication data switch having at least one egress interface;
  to define a first feature chain as a sequentially-traversed list containing at least one feature handled by the ingress line card, followed by at least one feature handled by a routing process applied by the service card, followed by at least one feature handled by the egress line card, and comprising the service feature;
  to associate a first feature chain with a first interface of the communication data switch;
  to accept a definition of a first failure policy for the service feature in the first feature chain, wherein the first failure policy includes a change in the first feature chain, so that upon a failure in the service feature, the service processor applies the first failure policy to the first interface; and
  wherein the service processor is arranged to invoke a redundant component as a backup for the service feature failure when the redundant component is available, and to apply the respective failure policy when there is no redundant component available.

14. The data switch according to claim 13, wherein the service processor is further arranged to associate a second feature chain, different from the first feature chain, to a second interface of the communication data switch.

15. The data switch according to claim 13, wherein the service processor is further arranged to associate a second failure policy, different from the first failure policy, to the second feature chain.

16. The data switch according to claim 15, wherein the first failure policy is assigned to the service feature in the first feature chain and the second failure policy is assigned to the service feature in the second feature chain.

17. The data switch according to claim 13, wherein the service feature is selected from a group consisting of: Quality of Service (QoS) features, virtual private network (VPN) features, security features, accounting features, statistics and billing features, netflow features, routing features, traffic redirection features, interception features, network address translation (NAT) features, application recognition features and load balancing features.

18. The data switch according to claim 13, wherein the first failure policy comprises a traffic dropping policy.

19. The data switch according to claim 13, wherein the first failure policy comprises a service bypass policy.

20. The data switch according to claim 13, wherein the first failure policy comprises an interface shutdown policy.

21. The data switch according to claim 13, wherein the first failure policy comprises a protocol shutdown policy.

22. The data switch according to claim 13, wherein the first failure policy comprises a feature chain change policy.

23. The data switch according to claim 13, wherein the first failure policy comprises a route cost change policy.

* * * * *